United States Patent [19]

Miller et al.

[11] 4,341,395
[45] Jul. 27, 1982

[54] ANTI-JACKKNIFING CONTROL DEVICE

[75] Inventors: Ray Miller; Ann Miller, both P.O. Box 57, Silver Bow, Mont. 59750; Hans Haumberger, Sr.; Hans Haumberger, Jr., both of Butte, Mont.

[73] Assignees: Ray Miller; Ann Miller, both of Silver Bow, Mont.

[21] Appl. No.: 122,680

[22] Filed: Feb. 19, 1980

[51] Int. Cl.³ .................. B62D 53/08; B60R 21/00
[52] U.S. Cl. ................................. 280/432; 340/52 R
[58] Field of Search .......... 280/432; 340/52 R, 52 H, 340/52 D

[56] References Cited

U.S. PATENT DOCUMENTS 2,146,145  2/1939  Huffman ........................... 280/432
2,213,221  9/1940  Johnson ............................ 280/432
2,959,429 11/1960  Lavelle ............................. 280/432
3,733,090  5/1973  Keller ............................... 280/432
4,206,829  6/1980  Melocik ............................ 180/290

Primary Examiner—John P. Silverstrim
Attorney, Agent, or Firm—Blair, Brown & Kreten

[57] ABSTRACT

An anti-jackknifing control device for a tractor-trailer which includes a fifth wheel having a pair of oppositely disposed pneumatically operated cylinder-piston assemblies, the pistons of which are insertable into arcuate slots in a bottom plate on the trailer so as to limit the turning movement of the tractor relative to the trailer to a predetermined angle in either direction from a centerline corresponding to a longitudinally aligned position of the tractor-trailer together with an alarm in the driver's cab actuted by a limit switch in each of the slots which is closed by the bottom plate at a turning angle in either directon intermediate the centerline and predetermined angle.

7 Claims, 7 Drawing Figures

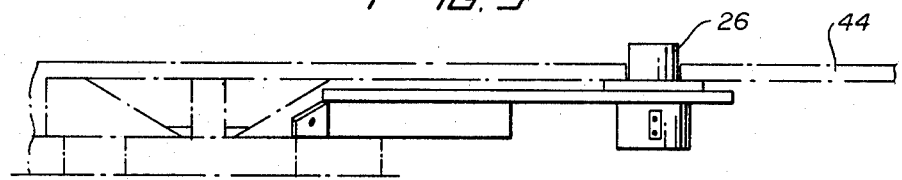
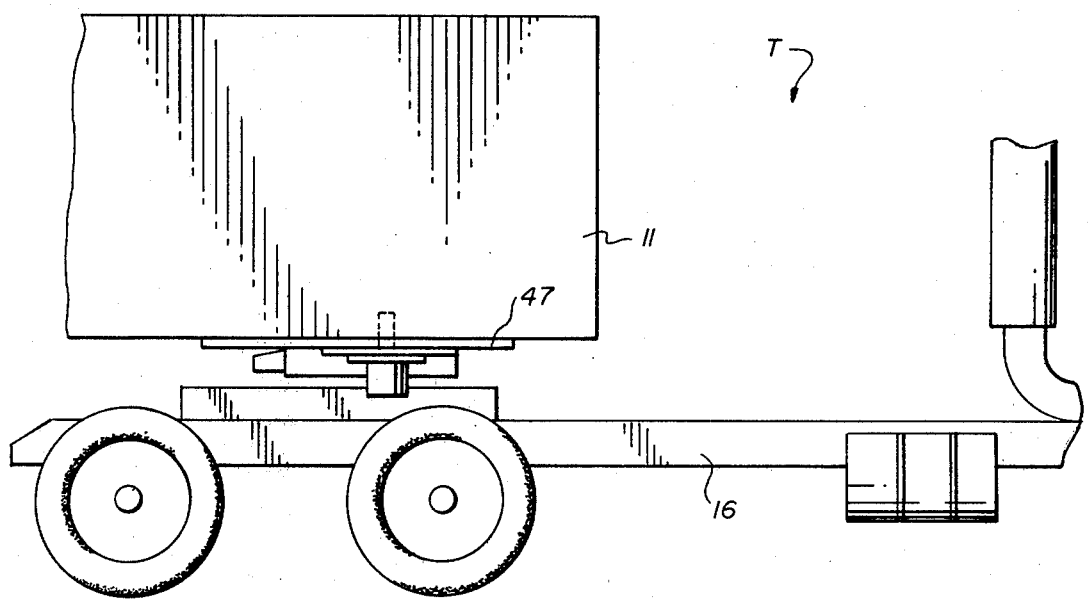
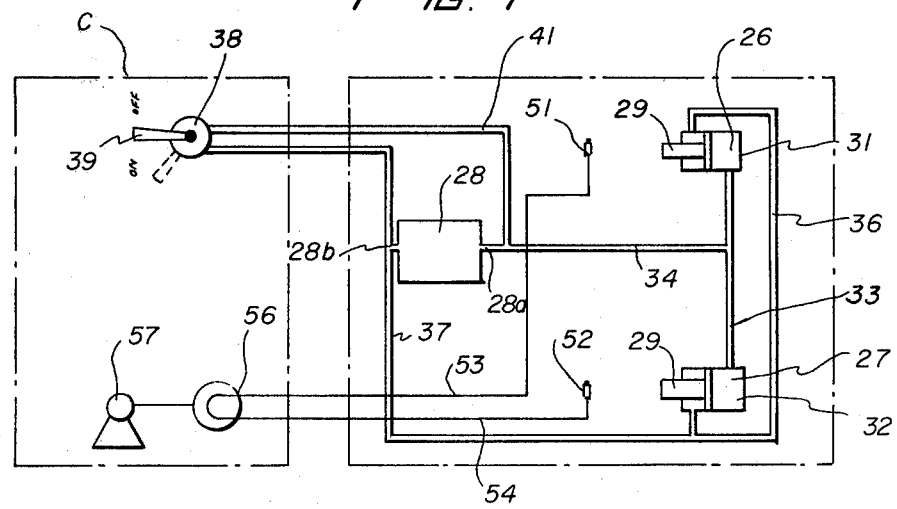

ANTI-JACKKNIFING CONTROL DEVICE

BACKGROUND OF THE INVENTION

In the operation of tractor-trailers, one of the most serious and destructive incidents is the inadvertent excessive swinging of the trailer from the centerline of travel so that the tractor and trailer close upon each other similar to the blade of a jackknife. This action, referred to as "jackknifing" is probably the most feared occurrence by all operators in the trucking industry. Jackknifing commonly occurs on slippery roads due to ice, rain or the like particularly on an incline. In a normal running of a tractor-trailer rig on a straight stretch of road, the fifth wheel pivots very little, if any. When making a turn, the fifth wheel pivots slightly and a deviation of up to ten degrees from the centerline of travel is more than adequate for highway travel. However, under slippery road conditions, this angle of deviation, regardless of its extent, will become a "critical angle" when the tractor-trailer rig begins to skid and swerve. At this time, a brief opportunity exists for the driver to correct the steering in an attempt to realign the tractor in the direction of the trailer as long as the "critical angle" is small enough to permit this. If the "critical angle" becomes too large, the moving mass of the trailer overcomes the ability to correct the tractor quickly enough and the trailer will actually whip the tractor around the fifth wheel pivot point smashing the tractor into the trailer. Various devices have been proposed to reduce jackknifing such as by physically constraining the pivotal movement of the tractor from passing through a predetermined angle. One such device is shown in U.S. Pat. No. 2,959,429 issued to W. D. Lavelle on Nov. 8, 1960 and entitled Fifth Wheel Safety Device. In the Lavelle patent, retractable rams are provided on the fifth wheel which may be moved into arcuate slots on the trailer body so that when an excessive turning angle is reached the rams engage the terminal ends of the slots. While the Lavelle device does provide some protection against jackknifing, it can be understood that such a device must be of extremely strong construction since the impact forces encountered are of substantial magnitude particularly when the angle at which the pivotal movement of the tractor is constrained is quite large. Furthermore, jackknifing can occur in such a device at smaller turning angles depending on the driving abilities of the driver and if the driver is unaware of incipient danger or distracted, insufficient time is available for taking corrective action utilizing steering control to regain the tractor and trailer thereby preventing jackknifing.

OBJECTS AND SUMMARY OF THE INVENTION

Accordingly, a primary object of this invention is to provide a new and novel anti-jackknifing control device which alerts the driver of a tractor-trailer rig of incipient jackknifing.

Another object of this invention is to provide a new and novel anti-jackknifing control arrangement which provides an alarm when jackknifing is likely and at the same positively constrains the tractor-trailer against jackknifing subsequent to the actuation of the alarm.

A further object of this invention is to provide a new and novel anti-jackknifing control device for the driver of a tractor-trailer rig which may be easily installed on a present day tractor-trailer rig, is relatively inexpensive in construction and which permits corrective steering action by the driver so as to prevent jackknifing.

A still further object of this invention is to provide a new and novel anti-jackknifing control device for a tractor-trailer rig which is capable of prolong use without breaking-down, which is positive in operation so as to provide a safety feature both for the driver of the rig as well as for other motorist in the vicinity of the tractor-trailer rig.

The object of this invention and other related objects are accomplished by the provision of a pair of cylinder-piston assemblies mounted on the fifth wheel of the tractor-trailer rig in oppositely disposed relationship which assemblies are connected to a source of compressed air for vertical movement of the piston between a retracted position and an extended position within a arcuate slot in the bottom plate of the trailer in association with a respective one of the assemblies. The end portions of the arcuate slots defined by the bottom plate are arranged for abutting engagement by the piston in the extended position to limit the turning movement of the tractor relative to the trailer to a predetermined angle in either direction of turning from a centerline corresponding to a longitudinally aligned position of the tractor with the trailer and means are provided on the fifth wheel for sensing a turning movement of the tractor relative to the trailer to an angle intermediate the centerline of traffic and this predetermined angle which sensing means are arranged to actuate alarm means in the trailer when this intermediate angle is sensed to indicate to the operator the need for a steering correction and thereby avoiding jackknifing for the tractor-trailer rig.

The invention will be better understood as well as further objects and advantages thereof will become evident from the ensuing detailed description of the preferred embodiments taken in conjunction with the drawings.

BRIEF DESCRIPTION OF THE DRAWINGS

FIG. 5 is a side elevation view of a portion of the fifth wheel of FIG. 2;

FIG. 6 is a side elevation view of a portion of the tractor-trailer rig of FIG. 1;

FIG. 7 is a diagrammatic view of the control system utilized in the anti-jackknifing control system constructed in accordance with the invention.

DESCRIPTION OF THE PREFERRED EMBODIMENT

Figure 1:
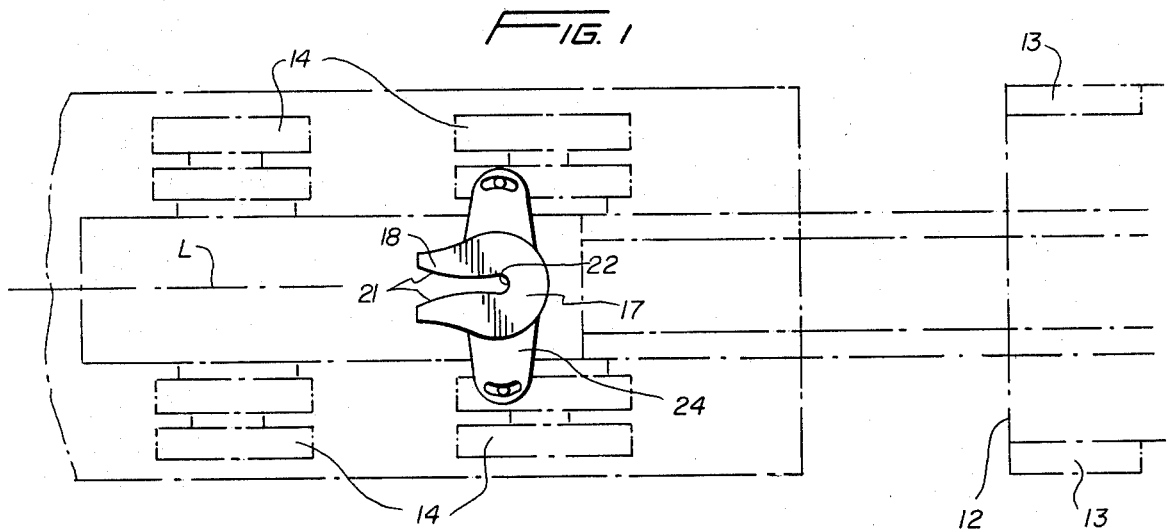
FIG. 1 is a plan view of a portion of a tractor-trailer rig shown somewhat schematically and illustrating a fifth wheel incorporating the anti-jackknifing control device of the invention.

Referring now to the drawings and to FIGS. 1 and 6 in particular, there is shown partly a tractor-trailer rig designated generally by the letter T which includes a trailer 11 and a tractor 12. The type of tractor-trailer rig to which the invention is particularly suitable is that type which is referred to as an "18-wheeler" with the tractor 12 provided with a pair of wheels 13 for steering. As is well known, the tractor 12 which is provided with a cab (not shown) accommodating the driver of the rig includes a rearwardly extending frame 16 supported at the rear by eight wheels 14 arranged in pairs on opposite sides of the chassis 16. The remaining eight wheels (not shown) support the rear portion of the trailer 11, the trailer wheels being preferably eight in number and arranged in pairs in a manner substantially the same as the arrangement of the tractor wheels 14.

The tractor is provided with the usual fifth wheel 17 which is suitably mounted tiltably on a suitable support secured to the tractor chassis 16. The fifth wheel 17 includes a guide portion 18 having guide surfaces 21 and an abuttment surface 22 for accommodating the kingpin (not shown) provided in the conventional manner on the trailer 11.

Figure 3:
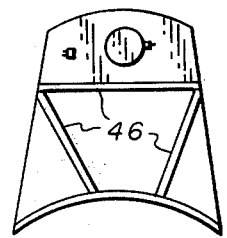
FIG. 3 is a bottom view of a portion of the fifth wheel of FIG. 2.
Figure 4:
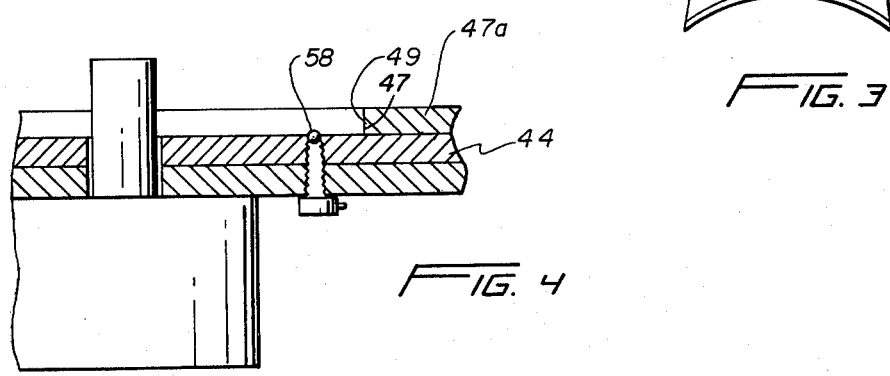
FIG. 4 is a sectional view taken substantially along line 4—4 of FIG. 2.

As shown best in FIG. 1, the fifth wheel 17 is provided with a pair of oppositely disposed laterally extending plate members 23, 24 which are mounted on the fifth wheel 17 by suitable means such as welding or the like. The plate members 23, 24 are arranged to support at least one preferably two cylinder-piston assemblies 26, 27 which are preferably pneumatically actuated and connected by suitable means to a source of compressed air such as an air pressure tank 28 as shown best in FIG. 7. The cylinder-piston assembly 26, 27 include a reciprocating piston 29 respectively movable by means of compressed air from a retracted position within the cylinders 31, 32 respectively into an extended position as shown in FIG. 4 and FIG. 7. The cylinders 31, 32 are connected together on one side of the pistons 29 respectively by means of an conduit 33 connected by means of conduit 34 to an outlet 28a on the source of compressed air such as the air pressure tank. On the other side of the pistons 29 the cylinders 31, 32 are connected together by means of conduit 36 also connected by means of conduit 37 to a compressed air return inlet 28b on the air pressure tank 28 and to one side of a normally closed manually operated valve 38 the valve 38 is provided with a operating handle 39 for actuation by the driver in the cab of the trailer 12 this cab area being designated generally by the letter C in FIG. 7. The other side of the valve 38 is connected by means of conduit 41 to conduit 34. Thus, the valve 38 is arranged to be moved into the open position corresponding to the solidline position of the operating handle 39 in which compressed air circulates freely through conduits 37, 41 between the inlet and outlet 28b, 28a respectively of the pressure tank so that the pistons 29 are maintained in the retracted position. In order to move the pistons 28, 29 into the extended position shown in FIG. 7, the operating handle 39 of the valve 38 is moved into the on or closed position corresponding to the brokenline position of the operating handle 39 shown in FIG. 7 thereby permitting pressure to be introduced from the tank 28 through conduit 34 into the cylinder 31, 32 through conduit 33 so that the pistons move upwardly into the extended position shown best in FIG. 4. The plate member 23, 24 are preferably provided with a arcuate shaped reinforcing plate 43, 44 respectively and on the underside of the plate members 23, 24 reinforcing webbing 46 is preferably provided for strength shown best in FIG. 3.

Figure 2:
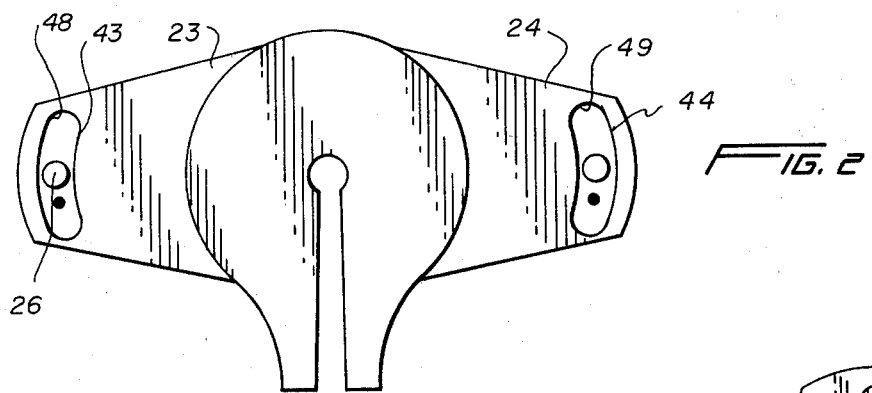
FIG. 2 is an enlarged view of the fifth wheel of the invention.

The underside of the trailer 11 is provided with a bottom plate 47 which overlies the fifth wheel 17 and which is provided with a pair oppositely disposed arcuate slots 48, 49 respectively as shown in brokenlines in FIGS. 1, 2. One of such arcuate slots 49 is shown in FIG. 4. The arcuate slots 48, 49 are arranged to accommodate the pistons 29 respectively in the extended position and in the extended position of the pistons 29 in the slots 48, 49 with the tractor 12 in longitudinally aligned relationship with the trailer 11 as indicated by the letter L in FIG. 1, the pistons 29 occupy a position intermediate the ends of the respective arcuate slots 48, 49. It can be seen, therefore, that during a turning movement of the tractor 12 relative to the trailer 11 the pistons 29 will abut one end of the slots 29 when a predetermined angle is reached in either direction from the centerline L thus physically constraining further turning movement of the tractor 12 past this predetermined angle limiting the tendency of the rig to jackknife and permitting some degree of steering control by the driver for realignment of the tractor and trailer 12, 11 respectively.

As specifically illustrative of the invention, means are provided on the fifth wheel 17 for sensing a turning movement of the tractor 12 relative to the trailer 11 to an angle intermediate the centerline L and the predetermined angle represented by the limits imposed by the turning movement of the tractor 12 by the ends of the arcuate slots 49. Most specifically, a pair of switches 51, 52 are mounted on the plate members 23, 24 respectively for engagement by the portions 47a of the bottom plate 47 defining the ends of the arcuate slot 48, 49 at the intermediate angle during the turning movement of the tractor 12 prior to the abutting engagement of the end portions of the slots 48, 49 with the pistons 29. The switches 51, 52 are connected by means of conductors 53, 54 (and to an associated source of electric power which is not shown) to alarm means in the cab C. In the preferred embodiment, the alarm means comprise visual means such as a light 56 and audible means such as a buzzer 57 for signaling the driver when the intermediate angle is reached during the turning of the tractor 12. As shown best in FIG. 4 each of the switches 51, 52 are mounted on the plate members 23, 24 in any suitable manner such as by screw threaded engagement with the plate members 23, 24 and the reinforcing plate 44 as shown best in FIG. 4. Each of the switches 51, 52 include an element 58 which is yieldingly urged upwardly into the space defined by the arcuate slots 48, 49 as shown best in FIG. 4. In the position in FIG. 4, with the element 58 extending upwardly into a stopped position, the switches 51, 52 are in the open position so that the light 56 and buzzer 57 are disconnected from the associated source of electric power. As the tractor 13 makes a turning movement which reaches the intermediate angle referred to above, the bottom plate portion 47a moves over the element 58 pressing it downwardly since it is in the form of a sphere so as to offer no resistance which moves the switches 51, 52 into the closed position activating the light 56 and the alarm buzzer 57. When the light 56 and buzzer 57 are activated an inattentive or distracted driver is then made aware of the fact that incipient jackknifing is present (although the full extent of the pivotal movement of the tractor 12 has not been reached) giving the driver adequate time by controlling to move the tractor 12 back into alignment with the trailer 11 as defined by the centerline L. When it is necessary that no limitation be imposed on the turning movement of the tractor 12, the driver moves the operating handle 39 of the valve 38 to the brokenline position of FIG. 7 so that the pistons 29 retract permitting the driver to make angular turns such as might be required during parking, or maneuver around city streets and negotiating relatively sharp turns.

What is claimed is:

1. An anti-jackknifing control device for a tractor-trailer and the like having a fifth wheel for coupling said tractor to said trailer and a source of compressed air comprising, in combination, at least one cylinder-piston assembly mounted on said fifth wheel, means for communicating said cylinder-piston assembly to said source of compressed air for vertical movement of said piston between an extended position and a retracted position, a bottom plate on said trailer disposed in overlying relationship with said at least one cylinder-piston assembly, said bottom plate having an arcuate slot for accommodating said piston in said extended position, said arcuate slot having ends defined by portions of said bottom plate abuttingly engageable by said piston in said extended position to limit the relative-to-turning movement of said tractor and said trailer to a predetermined angle in either direction from a centerline corresponding to a longitudinally aligned position of said tractor with said trailer, and means on said fifth wheel for sensing a turning movement of said tractor relative to said trailer to an angle intermediate said centerline and said predetermined angle and alarm means in said trailer actuated by said sensing means when said intermediate angle is sensed to indicate to the operator the need for a steering correction to avoid jackknifing of said tractor-trailer wherein said sensing means comprise a pair of switches mounted on said fifth wheel each of said pair of switches being associated with a respective one of said arcuate slots, means for connecting said pair of switches to said alarm means, each of said pair of switches being arranged for engagement by said bottom plate portion defining one of said ends of the respective arcuate slot at said intermediate angle between said tractor and said trailer for actuating said alarm means, one of said pair of switches being arranged to actuate said alarm means in one direction of turning of said tractor and the other of said pair of switches being arranged to actuate said alarm means in the opposite direction of turning of said tractor.

2. An anti-jackknifing control device in accordance with claim 1 wherein two of said cylinder-piston assemblies are mounted on said fifth wheel in oppositely disposed relationship and wherein said bottom plate is provided with two of said arcuate slots each arranged in association with a respective one of said cylinder-piston assemblies.

3. An anti-jackknifing control device in accordance with claim 2 wherein said communicating means are arranged to communicate both of said cylinder-piston assemblies with said source of compressed air and include a manually operated valve in said tractor accessible to the driver of said tractor-trailer movable between an on position for connecting said cylinder-piston assemblies to said source of compressed air for moving said piston into said extended position and an off position for disconnecting said cylinder-piston assemblies from said source of compressed air to move said piston into said retracted position.

4. An anti-jackknifing control device in accordance with claim 3 including light means in said trailer responsive to the movement of said valve into said on position for visually indicating the movement of said pistons into said extended position.

5. An anti-jackknifing control device in accordance with claim 3 wherein said alarm means comprises a visual alarm.

6. An anti-jackknifing control device in accordance with claim 5 wherein said alarm means comprises an audible alarm.

7. An anti-jackknifing control device in accordance with claim 3 wherein each of said pair of switches comprises a normally open ball-type switch having a movable element yieldingly urged upwardly into said respective arcuate slot, said movable element being engageable by said bottom plate portion at said intermediate angle to depress said movable element downwardly for closing said switch.

* * * * *